Figure 1:
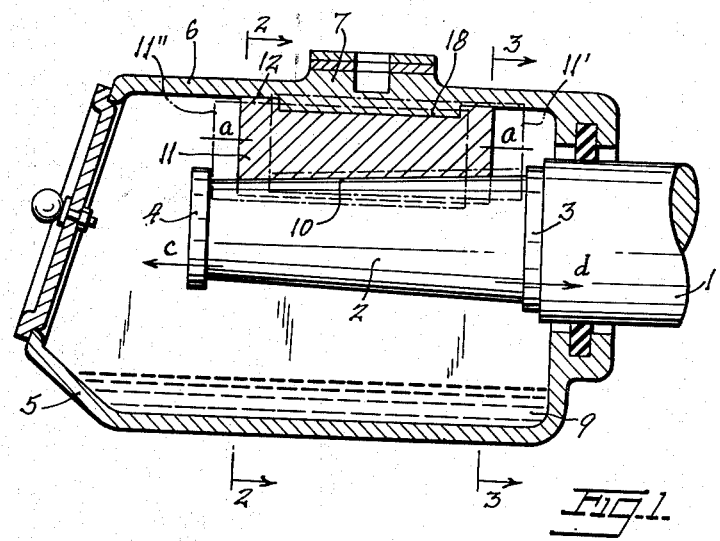

June 15, 1954

R. TURK 2,681,258

AXLE BEARING FOR ROLLING STOCK

Filed March 26, 1952

INVENTOR.
ROBERT TURK
BY
Zoltan A. Polachek
ATTORNEY

Patented June 15, 1954

2,681,258

UNITED STATES PATENT OFFICE 2,681,258

AXLE BEARING FOR ROLLING STOCK

Robert Turk, Gars am Kamp, Austria

Application March 26, 1952, Serial No. 278,694

6 Claims. (Cl. 308—53)

The invention relates to an axle bearing for rolling stock, which comprises a bearing bush lying on top of the journal, and a device to apply the lubricant on the bearing surface of the rotating journal, the journal being axially movable relative to the bearing bush in both directions from an intermediate position. Particularly in heavily loaded axle bearings of rolling stock it has been found again and again that even if their bearing surfaces have been inspected most carefully the bearing bushes often do not stand through a single inspection interval or, at least, exhibit abraded bearing surfaces from one inspection to the next. The reason for this drawback resides in that under the loading pressure of the carriage the bearing surface of the bearing bush rests on the journal nearly at one and the same point, at the apex of the arc. For this reason the bearing surface of the bearing bush is frictionally stressed most heavily by the journal at this point. Thereby excessive heat may often be generated at this point of the bearing surface of the bearing bush, in spite of lubrication, and the effect of the lubricant is heavily reduced. As a result, the apex of the bearing surface of the bearing bush is gradually abraded in both peripheral directions. As the abraded part of the bearing surface increases, it will offer a larger resistance to the passage of the film of lubricant from the journal and the abrasion of the bearing surface will proceed with even larger acceleration. This abrasion finally leads to the journal running hot.

It is an object of the invention to utilize the axial play of rolling stock axles relative to the bearing bush for a favorable distribution of the film of lubricant on the journal so that by the axial motion of the journal lubricant is supplied under all circumstances to the apex zone of the bearing surface of the bearing bush.

In accordance with the invention this problem is solved thereby that the bearing surfaces of the bearing bush and journal are tapered and that the cones formed by both bearing surfaces rest one on the other fully or almost fully in the intermediate position of the axial relative movement.

When tapered bearing surfaces are displaced axially in one or the other direction, the bearing surface of the bearing bush is lifted in either direction adjacent to the apex of the margins of the bearing bush. Consequently, crescent-shaped cushions of lubricant alternately form either adjacent to the apex of the margins of the bearing surface. These cushions provide for the permanent maintenance of the film of lubricant adjacent to the bearing surface of the bearing bush.

In the drawing several embodiments of an axle bearing for rolling stock, constructed according to the invention, are shown diagrammatically by way of example in longitudinal sectional views.

Fig. 1 is a longitudinal sectional view showing a journal supporting a bearing bush having a tapered bearing surface, the journal being shown in its intermediate position.

Figure 2:
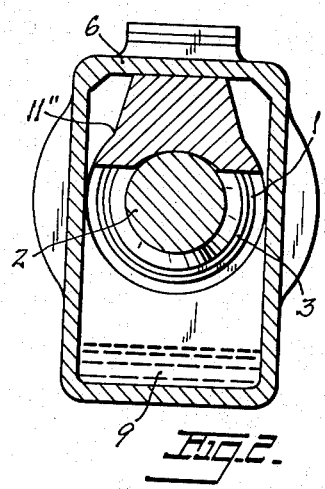
Figure 3:
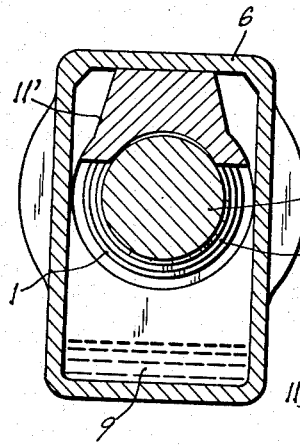

Figs. 2 and 3 are vertical sections taken on line 2—2 and line 3—3 respectively, of Fig. 1 to illustrate in an exaggerated representation the formation of a cushion of lubricant of crescent-shaped cross section by a relative axial movement of the journal from the intermediate position to the left (Fig. 2) or the right (Fig. 3), the extent of the displacement of the journal to the left or right being indicated in Fig. 1 by dash-and-dot lines.

Figure 4:
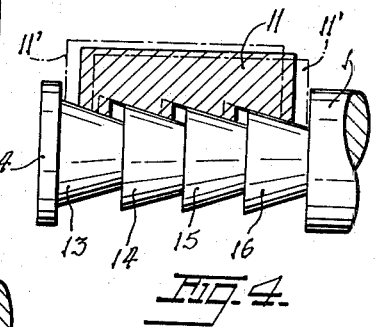

Fig. 4 is a longitudinal sectional view of a modification of a bearing in which the bearing surfaces of the journal and of the bearing bush have several equally directed cones of the same taper.

Figure 5:
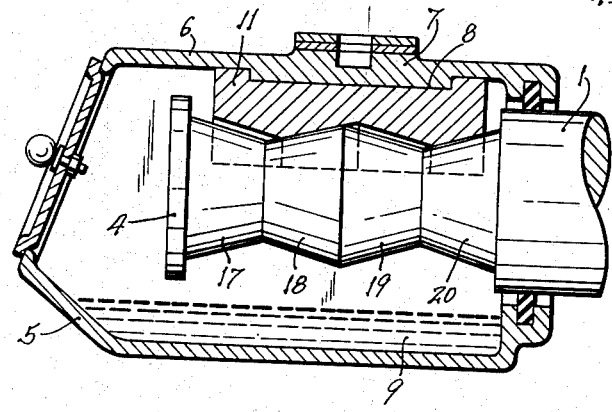

Finally, Fig. 5 represents an axle bearing for rolling stock, in which the bearing surfaces of the journal and bearing bush are divided into several partial cones, respectively, which are oppositely directed in pairs.

The solution of the problem as illustrated in the drawings is based on a combination of the rotary and axial motions of the journal. As shown in Fig. 1 the wheel axle 1 has a tapered journal 2, which is set off toward the axle by a shoulder 3 and has at its free end a flange 4. Normally the taper of the journal is very small. In the drawing, however, the taper is exaggerated for greater clearness. The journal box 5 is a normal axle bearing for rolling stock, which has on top of its top member 6 an extension 7 to support the springs (not shown) and has on the underside of the housing top member 6 an extension 8, suitably of rectangular surface configuration and small height. Below the journal 2 the bearing forms the known oil sump 9, out of which the lubricant is applied continuously to the peripheral surface of the journal 2 by means of an applying device, e. g., a pack of wicks (not shown). The journal supports the tapered bearing surface 10 of an upper bearing bush member 11, the bearing surface of which extends to the right and left of the vertical axial center plane over an angle of at least 25 deg. and at most 45 deg., the taper of the bearing surface corresponding accurately to that of the journal. The bearing bush member 11 has in its supporting surface 12 a recess to fit around the extension 8 of the housing top member 6. Thus the bearing bush member 11 is secured in the housing 5 against movement in the horizontal plane in any direction. The length of the bearing bush member 11 is shorter than the journal 2. Therefore, a clearance $a$ remains between the end faces of the bearing bush member 11 and the shoulder 3 and flange 4, respectively, of the journal 2, if the center of the bearing bush is at half the length of the journal and rests with its tapered bearing surface 10 fully or almost fully on the peripheral surface of the tapered journal.

In axial bearings for rolling stock such axial play of the wheel axles relative to the bearing bushes is provided and amounts, depending on the construction of the bearing, to between 2 and 5 millimeters. It is known that when the wheel is rolling the journal performs an axial motion relative to the axle bearings, in both directions. This motion is caused by the lateral forces effective in curves, and by variations on the level of the two rails of a track. Owing to the taper of the journal and of the bearing surface of the bearing bush constructed in accordance with the invention, this axial motion is utilized for a permanently perfect lubrication of the surface of the journal, in such a manner that by the relative axial displacement of journal and bearing bush the bearing surface of the latter is slightly lifted from the journal so that the film of lubricant applied by the applying device to the journal forms either at the longitudinal margins of the bearing surface or adjacent to its apex crescent-shaped cushions of lubricant, which provide for an adequate lubrication of the bearing surface of the bearing bush at all parts that may be pressurized at any time. These crescent-shaped cushions of lubricant are formed in the following manner: When the journal 2 is moving towards the front of the bearing in the sense of the arrow $c$, the bearing bush member 11, being fixed in the journal box 5, slides with its bearing surface upwardly on the journal until, when the play of the journal is fully utilized, it reaches the position shown with dash-and-dot lines in Fig. 1 and designated 11'. Fig. 3 shows that as the bearing bush is thus sliding upwardly on the journal an air gap of crescent-shaped cross section is formed adjacent to its apex because the diameter and cross-sectional curvatures of the bearing surface of the bearing bush and of the journal no longer agree, e. g., adjacent to the shoulder 3. If, however, the wheel axle moves axially in the sense of the arrow $d$, the bearing bush with its bearing surface slides on the cone of the journal until it strikes the flange 4 indicated with the dash-and-dot line 11''. In this case the cross-sectional curvatures of the bearing surfaces do not agree because the bearing surface of the bearing bush, owing to its larger radius of curvature, leaves along its longitudinal margins wedge-shaped air gaps and rests on the journal only adjacent to the apex. Fig. 2 shows this position.

Fig. 4 shows that it is possible without difficulty to divide the conical bearing surfaces of the bearing bush and of the journal into several, equally directed partial cones 13, 14, 15, 16, of equal taper, which form stepped bearing surfaces on the journal and bearing bush. In this case too it is essential to provide for an axial play between the bearing bush and journal, within which the bearing bush may slide on the cones from the intermediate position shown in Fig. 4 downwardly to the right or upwardly to the left. In this case the conditions adjacent to each of the partial cones 13 to 16 are the same as shown for the first embodiment in Figs. 2 and 3.

Fig. 5 finally shows an axle bearing for rolling stock, of the same construction as shown in Fig. 1, with the difference that the conical bearing surfaces of the bearing bush 11 and of the journal 2 are divided into partial cones 17, 18, 19 and 20, of equal taper, which are oppositely directed in pairs. Thus upon an axial displacement of the journal 2 relative to the bearing bush 11, from the intermediate position shown in Fig. 5, the equally directed cones (18, 20 or 17, 19) are loaded. During this relative axial motion of the journal the cross-sectional relationships of the respective loaded partial cones, e. g., 18 and 20, are the same as shown in Figs. 2 and 3 and explained already with reference to the first embodiment. In this construction it is significant that the upper, and only, bearing surface of the bearing bush, extending on both sides of the axial center plane over an angle of 45 deg., rests on at least two equally directed partial cones of the journal so that the bearing surface is supported on several points regardless of the extent of the axial play of the journal.

I claim:

1. An axle bearing comprising a journal box, a tapered journal rotatably mounted in said box and including stop flanges at either end thereof, and a bearing bushing fixedly mounted within said box and provided with a lower curved surface directly engaging the upper surface of said journal between said stop flanges, the length of said bushing surface being shorter than the length of said journal between said stop flanges, said journal being free to move axially relative to said fixed bushing to an extent limited by said stop flanges.

2. The combination of claim 1 wherein said bearing bushing includes a longitudinal channel on the upper surface and said journal box includes a depending extension received in said channel to secure the bushing against longitudinal movement in either direction.

3. The combination of claim 1 wherein the lower curved surface of said bushing is concave and extends over the vertical axial center of the journal.

4. The combination of claim 1 wherein the journal consists of a unitary cone shape.

5. The combination of claim 1 wherein the journal consists of a plurality of co-axial short cone members to provide stepped bearing surfaces, said bushing being complementarily stepped.

6. The combination of claim 1 wherein the journal is divided into partial cones of equal taper, said cones being oppositely directed.

References Cited in the file of this patent
UNITED STATES PATENTS

| Number | Name | Date |
|---|---|---|
| 221,040 | Devlin | Oct. 28, 1879 |
| 238,813 | Shimer | Mar. 15, 1881 |
| 2,157,455 | Kimmel | May 9, 1939 |